Patented July 18, 1950

2,515,281

UNITED STATES PATENT OFFICE 2,515,281

PROCESS FOR PREPARING LUBRICATING OIL ADDENDS

Franklin M. Watkins, Flossmoor, Ill., assignor to Sinclair Refining Company, New York, N. Y., a corporation of Maine No Drawing. Application June 6, 1946, Serial No. 674,923

2 Claims. (Cl. 260—139)

My invention relates to a method for removing oxygen compounds from turpentine, by which term I mean to embrace not only turpentine itself, but also turpentine fractions, including turpentine oil and the material sold under the name "Pinene 111," which is a fractionated turpentine reported as containing about 92% alpha pinene, 4–5% camphene, and 3–4% dipentene and other terpenes.

Copending application, Serial No. 494,687 of Robert L. May, filed July 14, 1943, Patent No. 2,486,188, issued October 25, 1949 describes a phosphorus- and sulfur-containing addend for mineral and lubricating oils, which is obtained by reaction of a phosphorus sulfide with turpentine, while May applications, Serial Nos. 545,193 and 545,195, both filed July 15, 1944, now Patents Nos. 2,409,877 and 2,409,878, both issued April 1, 1946, and May Patents Nos. 2,392,252 and 2,392,253, both of which issued on January 1, 1946, describe addends produced by further reacting the phosphorus sulfide-turpentine reaction product or a substance derived therefrom with other materials.

All of these addends are active anti-oxidants and effectively repress the deterioration of lubricating oils but, unfortunately, they impart a very disagreeable onion-like odor thereto. This odor, it has recently been discovered, derives from oxygen impurities naturally present or formed in the turpentine used in the preparation of the phosphorus sulfide-turpentine reaction product. The oxygen impurities apparently react with the phosphorus sulfide, forming sulfur derivatives which are directly responsible for the odor. In the case of the addend of the first of the May applications, above identified, the odor is usually not noticeable in the addend itself but develops following addition of the addend to the lubricating oil.

According to the present invention, I remove or inactivate a substantial portion of these oxygen compounds before the turpentine is reacted with the phosphorus sulfide and I thereby materially improve the odor of compounded oils containing the addends. I accomplish this by a process which comprises heating the turpentine over metallic sodium.

I am not certain as to the mechanism of the reaction involved in my process but it appears that the sodium causes the polymerization of some of the oxygen impurities and that sodium derivatives of other of the oxygen impurities are formed which do not react with phosphorus sulfides.

In the practice of my process, I generally heat the turpentine in the presence of the sodium to reflux temperature and retain it at such temperature for about 5 hours. Thereafter, I may simply distill the mixture, taking, as product of the process, a fraction boiling within a predetermined boiling range or, alternatively, I may take, as the product, the clear liquid obtainable by filtration and decantation of the residue following a distillation carried out at a temperature up to the boiling range of the product.

The following examples submitted in illustration of my invention are not to be construed as in any way restrictive of the scope thereof:

Example 1

In a blank test, a sample of Pinene 111, 544 grams, (4 moles), was heated on a sand bath in a three liter, three-necked flask equipped with a mechanical stirrer. After the temperature reached 250° F. the source of heat was removed and 222 grams, 1 mole, of phosphorus pentasulfide was added in small increments over a 90 minute period, the temperature of the exothermic reaction being thereby maintained at about 275° F. After the addition of the last increment of the phosphorus pentasulfide, the reaction was continued for 12 hours at 275° F., following which 176 grams, 1 mole, of p-cyclohexylphenol was added. After further reaction for 10 hours at 275° F., the mixture was blended with 1022 grams of a low viscosity mid-continent oil. 2¼ parts by weight of the resulting oil concentrate, after filtration, was mixed with 97¾ parts by weight of a mid-continent SAE 20 motor oil. This blend had an offensive onion-like odor suggestive of mercaptans.

Example 2

A second sample of the Pinene 111 was distilled and 544 grams of the overhead (boiling at 156–157° C.) was reacted with phosphorus pentasulfide and p-cyclohexylphenol, the procedure being the same as that described in Example 1 except that an atmosphere of nitrogen was maintained in the reaction flask. The odor of the final blend was equivalent to that of the final blend of Example 1.

Example 3

A 3000 gram sample of the same Pinene 111 was refluxed for 5 hours over metallic sodium and then distilled to separate a fraction boiling at 156–157° C. When a portion of this fraction was employed according to Example 2, the final blend was nearly odorless. A sample of ordinary turpentine, treated in a similar manner, gave a blend, which while more odoriferous than the blend prepared with the sodium-treated Pinene 111, was much superior in the respect of odor to a blend containing the turpentine phosphorus-sulfide reaction product prepared with untreated turpentine.

*Example 4*

A second portion of the fraction obtained in the distillation of Example 3 was employed according to Example 1. The final blend was relatively odorless as compared to the final blend of Example 1.

Apart from the fact that it improves the odor of the blends, my process is advantageous in that the addend is rendered more thermally stable. Thus, when the phosphorus sulfide-turpentine reaction product, prepared with turpentine which has been treated according to my process, is heated under reflux at 350° F. for as long as 16 hours, no decomposition, as would be indicated by the formation of a precipitate, occurs. On the other hand, when the reaction product is prepared, as heretofore, with turpentine from which oxygen impurities have not been removed, a precipitate is formed in two hours and the precipitate progressively increases in quantity on further heating.

Where the turpentine to be processed according to my invention has a high peroxide content, it is advantageous to subject it to a pretreatment with caustic soda or other alkali. In the pretreatment as effected with caustic soda, I generally use about 1 part by weight of 40% aqueous caustic for each 20 parts of the turpentine, refluxing the mixture for a period of some 8-10 hours. Contrary to what might be expected, the alkali treatment alone will not remove oxygen compounds responsible for the objectionable odor in the blends.

Following the purification treatment of the invention, an oxidation inhibitor, such as hydroquinone or pyrogallol may be added to the turpentine in order to prevent the subsequent formation of oxygen impurities.

I claim:

1. In a process for preparing a lubricating oil addend which involves subjecting a turpentine which initially includes oxygen-containing impurities to reaction with a phosphorus sulfide at a temperature approximating 275° F. whereby there is produced an oil-soluble phosphorus- and sulfur-containing reaction product useful as a lubricating oil addend, the improvement comprising subjecting the turpentine including the oxygen-containing impurities prior to reaction of the turpentine with the phosphorus sulfide, to heating at refluxing temperature in the presence of metallic sodium and then distilling the reaction product, whereby the turpentine is rendered substantially free of oxygen-containing impurities that are reactive with phosphorus sulfide to produce compounds which have an objectionable odor and which are thermally unstable.

2. In a process for preparing a lubricating oil addend which involves subjecting a turpentine which initially includes oxygen-containing impurities to reaction with phosphorus pentasulfide at a temperature approximating 275° F. whereby there is produced an oil-soluble phosphorus- and sulfur-containing reaction product useful as a lubricating oil addend, the improvement comprising subjecting the turpentine including the oxygen-containing impurities prior to reaction of the turpentine with phosphorus pentasulfide, to heating at refluxing temperature in the presence of metallic sodium and then distilling the reaction product, whereby the turpentine is rendered substantially free of oxygen-containing impurities that are reactive with phosphorus pentasulfide to produce compounds which have an objectionable odor and which are thermally unstable.

FRANKLIN M. WATKINS.

REFERENCES CITED

The following references are of record in the file of this patent:

UNITED STATES PATENTS

| Number | Name | Date |
|---|---|---|
| 1,600,143 | Sherk | Sept. 14, 1926 |
| 1,926,648 | Powers | Sept. 12, 1933 |
| 2,076,875 | Borglin | Apr. 13, 1937 |
| 2,381,377 | Angel | Aug. 7, 1945 |

FOREIGN PATENTS

| Number | Country | Date |
|---|---|---|
| 23,875 | Great Britain | 1906 |

OTHER REFERENCES

Henrich Chem. Abs. vol. 15, 3757 (1929).
Kuwata Jour. of the Faculty of Eng. Tokyo Imperial University, Tokyo, Japan, vol. XVIII, No. 5, 120 (1929).